(12) United States Patent
Syed et al.

(10) Patent No.: US 11,616,725 B1
(45) Date of Patent: Mar. 28, 2023

(54) HIERARCHICAL TOKEN BUCKETS

(71) Applicant: Amazon Technologies, Inc., Seattle, WA (US)

(72) Inventors: Salman Ahmad Syed, Union City, CA (US); Sandeep Kumar, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/305,130

(22) Filed: Jun. 30, 2021

(51) Int. Cl.
*H04L 47/125* (2022.01)
*H04L 47/78* (2022.01)
*H04L 47/215* (2022.01)

(52) U.S. Cl.
CPC .......... *H04L 47/125* (2013.01); *H04L 47/215* (2013.01); *H04L 47/781* (2013.01); *H04L 47/782* (2013.01)

(58) Field of Classification Search
CPC ... H04L 47/125; H04L 47/215; H04L 47/781; H04L 47/782; G06F 21/105
See application file for complete search history.

(56) References Cited

U.S. PATENT DOCUMENTS

| | | | | |
|---|---|---|---|---|
| 7,574,443 | B2 * | 8/2009 | Bahar | H04L 67/1001 |
| 9,703,602 | B1 * | 7/2017 | Kusters | G06F 9/4881 |
| 10,313,117 | B1 * | 6/2019 | Carlough | H04L 63/0442 |
| 10,432,429 | B1 * | 10/2019 | Matthews | H04L 69/28 |
| 2001/0011303 | A1 * | 8/2001 | Chang | H04L 51/066 |
| | | | | 709/227 |
| 2012/0011244 | A1 * | 1/2012 | Zhu | G06F 21/105 |
| | | | | 709/224 |
| 2012/0079577 | A1 * | 3/2012 | Hao | H04N 21/64322 |
| | | | | 726/7 |
| 2015/0013006 | A1 * | 1/2015 | Shulman | H04L 63/1416 |
| | | | | 726/23 |

* cited by examiner

*Primary Examiner* — Kan Yuen
(74) *Attorney, Agent, or Firm* — Knobbe, Martens, Olson & Bear, LLP

(57) ABSTRACT

Systems and methods are provided for efficient handling of user requests to access shared resources in a distributed system, which handling may include throttling access to resources on a per-resource basis. A distributed load-balancing system can be logically represented as a hierarchical token bucket cache, where a global cache contains token buckets corresponding to individual resources whose tokens can be dispensed to service hosts each maintaining a local cache with token buckets that limit the servicing of requests to access those resources. Local and global caches can be implemented with a variant of a lazy token bucket algorithm to enable limiting the amount of communication required to manage cache state. High granularity of resource management can thus enable increased throttle limits on user accounts without risking overutilization of individual resources.

21 Claims, 6 Drawing Sheets

HIERARCHICAL TOKEN BUCKETS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more virtualized "sandboxes" that appear and operate as independent execution environments to users of a data center. For example, hardware virtualization can be used to provide a fully emulated hardware computing device (a "virtual machine"). Operating-system-level virtualization can enable a kernel of an operating system to provide multiple isolated user space instances (often called "containers") without requiring virtualization of the kernel. With virtualization, the single physical computing device can create, maintain, delete, or otherwise manage execution environments in a dynamic manner. In turn, users can request computer resources from a data center, including containers, computing devices, or combinations thereof, and be provided with varying numbers of virtualized resources.

The workloads supported in data centers, such as execution of processes on virtual machine resources, vary in their utilization of computing resource. It is typically desirable to ensure that a given computing resource is not overutilized by a single user. Accordingly, many data centers limit the number of workload requests a user can make to access the data center's resources.

DETAILED DESCRIPTION

Figure 1:
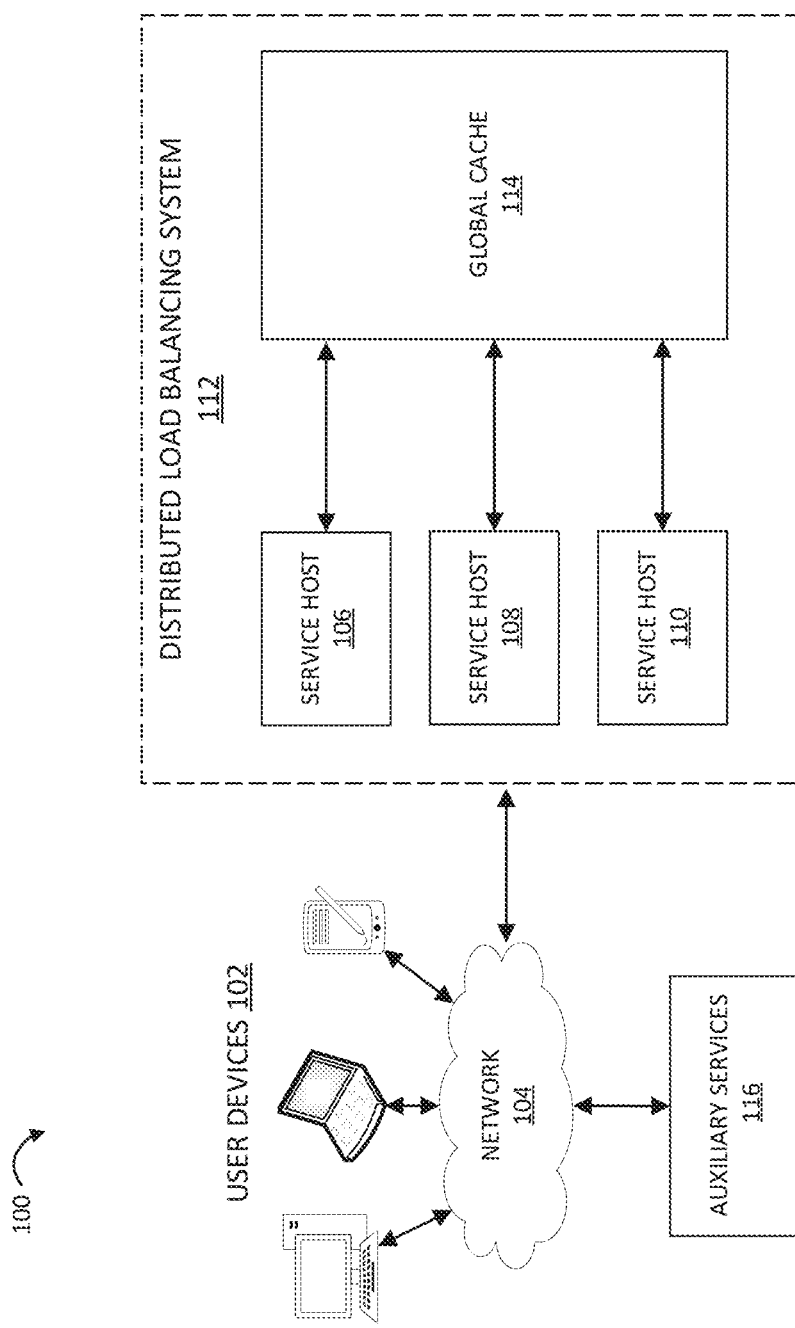
FIG. 1 is a block diagram depicting an illustrative environment in which a distributed load-balancing system can operate to prevent overutilization of shared computing resources.

Generally described, aspects of the present disclosure relate to scalable systems for load-balancing of requests that access shared resources in a distributed computing environment, including systems that minimize any additional overhead required to manage requests, by using a hierarchical token bucket. As described herein, a distributed system may include many service hosts each providing accessors through which clients may make service requests that access shared resources. Clients may include end-user devices as well as other remote computing services. Clients may each make a certain number of requests in a given time period, or interval, according to a throttle limit associated with the client's account. Once this number of requests has been exceeded, any further requests the client makes may be throttled, and may not be processed during the current interval. The service hosts may likewise have a limited access to shared resources, and have a throttle limit that restricts their access to a particular resource to a certain number of accesses within the time period prescribed by its interval. In order to ensure that a single client cannot exhaust a service's limited access to a particular resource, the client's throttle limit is generally much lower than that of the service host. Were the client's throttle limit equal to that of the service host, a single client could potentially exhaust the service's resource accesses and prevent other clients from making requests, despite those other clients not having exceeded their own throttle limits. This is generally undesirable, as it inhibits the ability of administrators to increase the throttle limits of clients who may desire to access a variety of computing services beyond the limit of any single resource. Thus, it is desirable from both the perspective of a client and of the system itself for service hosts to be able to throttle client requests at a resource-level granularity.

Embodiments of the present disclosure enable this level of granularity in throttling requests. More specifically, a load-balancing system as described herein can include a configurable granularity of request throttling to control access to specific resources according to the needs of each resource. Illustratively, requests to access a given resource, such as a storage snapshot, may be throttled according various parameters of each request, such as to the snapshot to be accessed, the API used to access it, the client account requesting access, etc. Any individual parameter, or combination of these parameters may make up a resource access key used to throttle the requests. Under this configuration, a client may send requests up to the throttle limit for a given key, and the service host may throttle any future requests for that key, but may continue to service requests for a different key. Thus, the client's account-level throttle limit may be increased over the throttle limit for a given resource without creating a risk that the client will starve access to that resource.

Granular access to shared resources in this fashion is complicated by the need for multiple service hosts to have overlapping access to shared resources. A client might make a series of requests to one service host for a given key up to the throttle limit, and then make subsequent requests to a different host for the same key. In order to ensure that the throttle limit for the key is not exceeded, the service hosts need to have shared knowledge of how many requests have been made for that key in the current interval. A simple method for accomplishing this is to have the service hosts each maintain a synchronized list of the number of requests made per key. This requires each host to notify every other when it receives a request, and wait for a response from each of them to ensure that simultaneous access to a key does not cause the throttle limit to be exceeded. This method creates undesirable overhead, both increasing the latency of processing each request and generating excess traffic that increases in proportion to the number of service hosts.

One solution to this problem is to implement a global token bucket. In a simple version of this solution, a global token bucket maintains a number of tokens for each key corresponding to the throttle limit for that key. When a service host receives a request for a key, it requests a token from the global token bucket. If the token bucket has enough tokens for that key, it decrements the token count and indicates to the service to process the request; when the number of tokens reaches zero, any subsequent requests are throttled. The token bucket is then refilled every interval to the throttle limit. This has the advantage of eliminating the need for service hosts to synchronize access to shared resources. However, this still causes an increase in latency and excess traffic, as each request to a service host must generate a token request and corresponding response to the token bucket that need to be processed before the client request can be serviced.

Alternatively, each service host may maintain its own local token bucket, servicing requests from the tokens it maintains for each key until they are depleted, and refilling the bucket after a period of time corresponding to its interval. However, this introduces a new set of problems. Administrative overhead is incurred in the need to manage the number of tokens available from each service host, to ensure that the combined total tokens across all the hosts does not exceed the throttle limit for each key. Adding or removing hosts requires updating the number of tokens in every single host. Further, underutilization of resources may result, in that more frequently-used hosts may deplete their tokens for a key well before the throttle limit for that key has been reached, while other service hosts idle with unused tokens, with the result that access to the key is effectively throttled despite its throttle limit not having been reached.

Embodiments of the present disclosure address these problems with a hierarchical approach utilizing both a global token bucket and local token buckets. In this approach, local token buckets maintained at each service host are filled from a global token bucket. When a service host exhausts its tokens for a given key, it may request additional tokens from the global token bucket. This facilitates centralized maintenance of the total number of tokens, and allows the number of service hosts to scale up and down without needing to adjust the token buckets of every other service host. This solution can also help to ensure full utilization of resources. Each local token bucket may be issued a fraction of the available tokens only on request to the global bucket, so that more frequently-used services get a greater share of the available tokens, and idle services do not tie up unused tokens and prematurely throttle access to resources.

Under one strategy, the token buckets may simply be refilled every interval. This can in some cases present further scalability issues as the key space grows. As the number of keys grows, a global cache that maintains the global token buckets must expend an increasing amount of time every interval to refill each bucket, irrespective of the buckets' utilization. Further, this presents issues with "high-cardinality" requests, where increasing cardinality means for a given number of requests the proportion of requests to access any single key decreases while the proportion of requests for distinct keys increases. As the cardinality of client requests increases, the number of requests from the service hosts for more tokens increases. This is particularly undesirable in addressing the problem of granular access to resources, as increasing granularity may result in higher cardinality of requests, wherein many different keys are reach requested only a few times. Embodiments of the present disclosure address this issue by implementing a lazy token bucket approach. Under this approach, the global cache refills the global token buckets no more often than once per interval. When a service host receives a request for a key corresponding to a local token bucket that is empty is empty, the service host can request more keys from the global token bucket. When the global cache hosting the global token bucket receives a request for more tokens from an empty bucket, the cache can compare the time of the last refill against the interval length, and if the interval has been exceeded, refill the bucket and dispense tokens to the requesting service host. If the interval has not expired, the cache can refuse the request to dispense tokens, and the service host may enter a throttle state and throttle all requests for that key until the interval has expired. This reduces the computational overhead of handling high-cardinality requests, as the global cache can expend resources to refill a given global token bucket only when a request to dispense tokens from that bucket is received.

Another benefit of this method is that it also allows the service hosts to tailor requests for more tokens according to their utilization, without tying up unused tokens in their local token buckets. By requesting tokens only when a key is requested for which the service host has an empty bucket, the service host ensures that it does not sit idle with tokens that could be used by other services. Alternatively or additionally, the service hosts may tailor their requests to the global token bucket according to their utilization. If a service host receives a request for a given key, it may compare the number of requests against the elapsed time to estimate the number of tokens it will require to service all of the client requests for the current interval, and request the estimated number of tokens from the global token bucket. This has the benefit of reducing the number of requests from service hosts to the global token bucket, thereby reducing network overhead and the computational burden on the global token bucket. In some embodiments, it further allows a service host to predictively assess whether it will run out of tokens for a given key, and send a preemptive request to the global cache for additional tokens. Further, in some embodiments, the service host may return tokens to the global bucket. Illustratively, return may be based on a determination at the service host that the returned tokens are unlikely to be used during a current period. For example, a service host may request a number of tokens in order to service requests corresponding to a user, and the user may subsequently disconnect, fail authentication, or otherwise indicate that future legitimate requests via the present connection are unlikely. In order to prevent the tokens from sitting unused, the service may send a request for a negative number of tokens to return those tokens to the global token bucket. A service host may further determine a number of tokens to return based on request velocity. For example, a service host may have requested 100 tokens based on requests received in the previous interval, but may receive only 5 requests in the first quarter of the current interval. The service host may then determine based on the current request velocity that it will only need 15 more tokens in the current interval, and return the remaining 80 tokens to the global token bucket. To forecast the required number of tokens, the token bucket may use a linear projection or any other forecast via a variety of known forecasting algorithms.

As will be appreciated by one of skill in the art in light of the present disclosure, the embodiments disclosed herein improve the ability of computing systems, such as distributed computing and storage systems, to efficiently and reliably support high granularity throttling of resource usage. Moreover, the presently disclosed embodiments address technical problems inherent within distributed computing systems; specifically, the inherent limitations of managing simultaneous access to shared resources within distributed systems under latency-sensitive conditions. These technical problems are addressed by the various technical solutions described herein, including the use of a hierarchical lazy token bucket to control the throttling of service requests accessing shared resources. Thus, the present disclosure represents an improvement on load balancing in distributed computing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 for a distributed load-balancing system 112, in which user devices 102 may interact with service hosts 106, 108, and 110 via a network 104. As discussed above, a distributed computing environment like the one depicted in FIG. 1 allows for the provision of computing resources through a plurality of services accessible to plurality of users simultaneously. In these environments, a load balancer may be used to inhibit individual users from monopolizing shared resources.

By way of illustration, various example user devices 102 are shown in communication with the service hosts 106-110, including a desktop computer, laptop, and a personal digital assistant (PDA). In general, the user devices 102 can be any computing device such as a desktop, laptop or tablet computer, personal computer, wearable computer, server, PDA, hybrid PDA/mobile phone, mobile phone, electronic book reader, set-top box, voice command device, camera, digital media player, and the like. The service hosts 106-110 may provide the user computing devices 102 with one or more user interfaces, command-line interfaces (CLI), application programing interfaces (API), and/or other programmatic interfaces for invoking service calls, tracking service requests, and/or viewing other logging or monitoring information related to the service. Although one or more embodiments may be described herein as invoking service calls, it should be appreciated that such embodiments may, additionally or alternatively, use any APIs or other programmatic interfaces.

The illustrative environment 100 further includes one or more auxiliary services 116, which can interact with the distributed load-balancing system 112 to implement desired functionality on behalf of a user. Auxiliary services 116 can correspond to network-connected computing devices, such as servers, which generate data accessible to the distributed load-balancing system 112 or otherwise communicate with the distributed load-balancing system 112. For example, the auxiliary services 116 can include web services (e.g., associated with the user computing devices 102, with the distributed load-balancing system 112, or with third parties), databases, really simple syndication ("RSS") readers, social networking sites, or any other source of network-accessible service or data source. In some instances, auxiliary services 116 may be invoked by the distributed load-balancing system 112, such as by API calls to the auxiliary services 116. In some instances, auxiliary services 116 may be associated with the distributed load-balancing system 112, e.g., to provide administrative, billing, or logging services to the distributed load-balancing system 112. In some instances, auxiliary services 116 actively transmit information, such as API calls or other task-triggering information, to the distributed load-balancing system 112. In other instances, auxiliary services 116 may be passive, such that data is made available for access by the distributed load-balancing system 112. For example, components of the distributed load-balancing system 112 may periodically poll such passive data sources, and trigger execution of code within the distributed load-balancing system 112 based on the data provided. While depicted in FIG. 1 as distinct from the user computing devices 102 and the distributed load-balancing system 112, in some embodiments, various auxiliary services 116 may be implemented by either the user computing devices 102 or the distributed load-balancing system 112.

The user devices 102, auxiliary services 116, and distributed load-balancing system 112 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The distributed load-balancing system 112 is depicted in FIG. 1 as operating in a distributed computing environment including several computer systems that are interconnected using one or more computer networks (not shown in FIG. 1). The distributed load-balancing system 112 could also operate within a computing environment having a fewer or greater number of devices than are illustrated in FIG. 1. Thus, the depiction of the distributed load-balancing system 112 in FIG. 1 should be taken as illustrative and not limiting to the present disclosure. For example, the distributed load-balancing system 112 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services. The cloud provider network may implement various computing resources or services, which may include a virtual compute service, data processing service(s) (e.g., mapreduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

In the example of FIG. 1, the distributed load-balancing system 112 is illustrated as connected to the network 104. In some embodiments, any of the components within the distributed load-balancing system 112 can communicate with other components of the distributed load-balancing system 112 via the network 104. In other embodiments, not all components of the distributed load-balancing system 112 are capable of communicating with other components of the environment 100. In one example, only the service hosts 106-110 may be connected to the network 104, and other components of the distributed load-balancing system 112 may communicate with other components of the environment 100 via the service hosts 106-110.

In FIG. 1, users, by way of user computing devices 102, may interact with the distributed load balancing system 112 via service hosts 106-110 to request access to shared resources. The service hosts 106-110 may directly process service requests, such as performing requested data processing on behalf of a user device, or they may act as "middlemen" to another device providing a service. In some cases, a service host may do both. In one example, a service host may act as a cache for a centralized storage device, returning a requested object if the service host has it cached, or forwarding the request to the centralized storage if the service does not have the object cached.

In FIG. 1, the environment 100 includes a set of service hosts 106-110 configured to provide a network-accessible service. The techniques described herein are widely applicable to a variety of services, and as such, the particular service provided by service hosts 106-110 is not described in detail herein. However, each service host illustratively corresponds to a computing device—virtual or physical—configured with executable instructions to provide the service to user devices 102.

The service hosts 106-110 as depicted in FIG. 1 are connected with a global cache 114. As described herein, the global cache 114 serves to prevent overutilization of individual resources by acting as a central repository for access tokens. A service host 106 that receives a request for access to a resource must first be in possession of one or more tokens associated with the requested resource. In order to acquire these tokens, the service host may request tokens from the global cache 114. By centralizing access to the tokens, the global cache 114 can ensure that no tokens for the resource are dispensed in excess of that resource's maximum utilization, eliminating the need for service hosts 106-110 to be aware of any concurrent utilization by other services.

Figure 2:
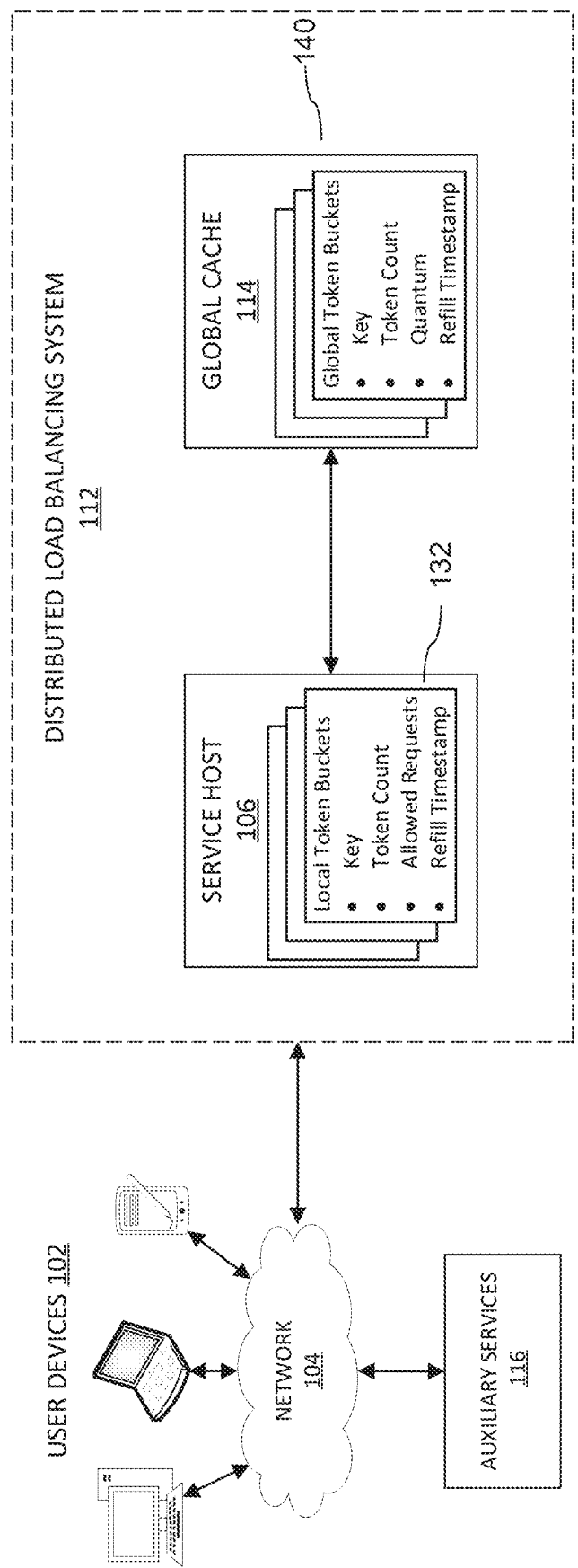
FIG. 2 is an illustrative visualization of various components of a distributed load-balancing system implemented in accordance with aspects of the present disclosure.
Figure 3:
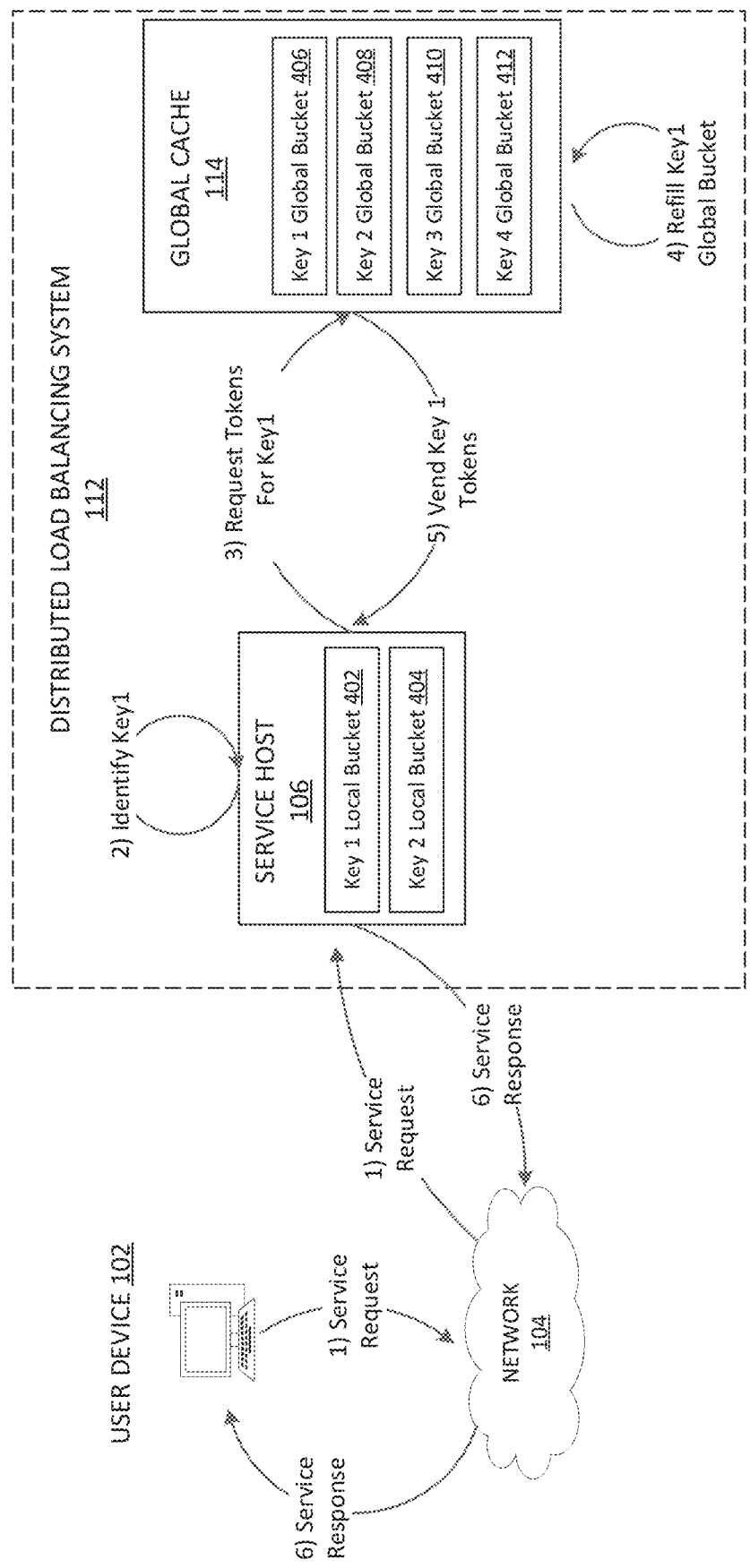
FIG. 3 depicts illustrative interactions on the distributed load-balancing system of FIG. 2 to handle a user request for access to a shared resource.

Turning to FIG. 2. a service host 106 is illustratively shown to include a plurality of local token buckets 132. As shown in FIG. 3., each local token bucket 132 may include a key, a token count, and a number of allowed requests. The allowed requests comprises a number of requests the service has processed over preceding time intervals, as described in further detail below. In some embodiments, this may only be a count of requests per interval, while in other embodiments the allowed requests may further comprise other metadata, such as when the requests were received or processed. The token count comprises a count of the number of tokens currently in the token bucket. The key corresponding to a local token bucket 132 may associate client requests with the token bucket. In some embodiments, the key may comprise a resource identifier, a user account identifier, and/or an API associated with the request. In some embodiments, the service host 106 may identify a key associated with a request by examining a portion of the request designated by an administrator during configuration of the distributed load balancing system 112. Additionally or alternatively, requests may include a specific field identifying the key. In some embodiments, the number of local token buckets 132 may be fixed. Alternatively or additionally, the local token buckets 132 may be dynamically instantiated in response to a service request with an associated key for which there is no corresponding token bucket. For example, a storage cache service may provide access to a plurality of data objects, some of which are accessed rarely. Instead of continuously maintaining a local token bucket for keys corresponding to the rarely used data objects, a service host 106 may wait until a request is received for a key corresponding to one of the data objects before instantiating a local token bucket corresponding to the key. In some embodiments, a local token bucket 132 may have an initial allotment of tokens. Alternatively, a local token bucket 132 may initially have a token count of 0, corresponding to a null allotment. In some embodiments, a local token bucket 132 may be periodically refilled with a predetermined number of tokens. In some embodiments, a predetermined allotment and/or refill interval may correspond to throttle limits of a shared resource. Returning to the example of a storage cache service, a service host 106 providing such a service may periodically refill the token buckets for keys corresponding to frequently used data objects with a number of tokens that corresponds to a share of those data objects' maximum utilization. In this way, the service host may ensure continuous availability of a resource without overutilizing it. In some embodiments, the token count of a local token bucket 132 may be periodically reset to 0. In some of these embodiments, the token count is reset after every refill interval.

As shown in FIG. 2, local token buckets 132 may be refilled with tokens dispensed by a global cache 114 from a global token bucket 140. In some embodiments, the number of global token buckets 140 may be fixed. Alternatively or additionally, the global token buckets 140 may be dynamically instantiated in response to a request from a service host 106 with an associated key for which there is no corresponding token bucket. In some embodiments, the global cache 114 may dispense tokens on a periodic basis. The period between dispensations may be based on a refill interval of a global token bucket 140. Alternatively or additionally, tokens may be dispensed in response to a request from a service host 106. The global cache 114 may refill the global token buckets periodically, based on each bucket's refill interval. Alternatively or additionally, the global cache may refill a token bucket in response to a request for more tokens from a service host. The number of tokens requested by a service host 106 may be based on a fixed fraction of the tokens in a corresponding global token bucket 140. Alternatively, a service host 106 may request a number of tokens based on the allowed requests associated with a local token bucket 132 and/or a refill interval of a corresponding global token bucket 140. For example, a service host 106 may calculate, based on a number of allowed requests of a local token bucket 132 over a period spanning the refill interval of a global token bucket 114 sharing the same key, the number of tokens it would need to request to accommodate a similar rate of requests over a subsequent period spanning the identified refill interval.

In some embodiments, it may be desirable for a service host 106 to throttle all requests with a key whose corresponding token bucket has already been refilled and subsequently emptied within a period of time spanning a predetermined interval. In order to determine whether the bucket has already been refilled, in some embodiments a local token bucket 132 may have a corresponding "cache" state, indicating whether the service host 106 has received a service request associated with the local token bucket 132 within a recent interval. For example, a local token bucket may be considered "cached" if it has received a request in the last "n" intervals, where n is configurable by an administrator. In these embodiments, a service host 106 may perform further processing when it receives a service request associated with a local token bucket 132 that has no tokens. Illustratively, if a local token bucket 132 is in a cached state, the service host 106 may further determine whether the local token bucket 132 has entered a throttled state, and throttle the request if it has. This determination may be based, for example, on a further determination that the refill timestamp of the token bucket is within the current interval. If the local token bucket 132 is not in a throttled state, the service host 106 may request more tokens from the global cache 114 based on a calculation of the expected request rate. In some embodiments, the calculation of the expected request rate is a weighted average of the number of requests received over a plurality of recent intervals, giving greater weight to more recent intervals than more distant intervals. If the local token bucket 132 is not in a cached state, the service host 106 may request more tokens from the global cache 114 further determine whether allowed requests of the token bucket exist within a determined time period. If allowed requests exist within the determined time period, the service host 106 may request more tokens from the global cache 114 based on a calculation of the expected request rate, as discussed above. Alternatively, if allowed requests do not exist within the determined time period, the service host may request more tokens from the global cache 114 based on a fixed number, a fraction of the token count of the global token bucket 140, or any other allotment scheme.

With reference to FIG. 3, illustrative interactions are depicted for servicing of a user request within a distributed load-balancing system to access a shared resource, including the refill of global and local token buckets corresponding to a request key. The interactions begin at (1), where a user device 102 sends a request to a service host 106.

At (2), the service host 106 identifies the key associated with the request and determines a corresponding local token bucket. In some embodiments, the service host may identify the key by inspecting keying fields configured by an administrator during setup of the load balancer. The service host 106 may, for example, determine based on the request that it is associated with Key 1, and Key 1 local token bucket 402 is the corresponding token bucket. The service host 106 may then determine that there are insufficient tokens in the local token bucket 402 to service the request. This may be because the service host 106 has not requested tokens during the current interval, or because the existing store of tokens has been exhausted by previous requests.

At (3), the service host 106 sends a request for tokens for Key 1 to the global cache 114 in response to a determination that the token bucket corresponding to Key 1 is not in a throttled state. This may be based on a determination that the service host has not already requested tokens from the global cache 114 during the current interval, and/or that it has not requested tokens and received a no-token response. Illustratively, the number of tokens the service host requests may be a fixed number of tokens, a fraction of the maximum tokens in global bucket 406, a number of tokens calculated based on a weighted average of previous requests as described above, etc. Alternatively, the request may not specify a number of tokens. For example, the service host may not have previously received a request for Key 1, and may request a fixed number of tokens reflecting the number of requests typical for any given key per interval. Alternatively, the service host may issue a request for more tokens without specifying a fixed number, and rely on the global cache 114 to determine the number of tokens to dispense, for example a fraction of the maximum tokens in the global token bucket corresponding to Key 1. If the service host 106 has history for Key 1, it may base the number of tokens requested on the allowed requests in the corresponding local token bucket in order to minimize the number of requests it needs to make for more tokens without running out of tokens in the current interval.

At (4), the global cache 114 refills global token bucket 406. Illustratively, the global cache 114 may track the time of the last refill via a refill timestamp, and determine on receipt of a token request that global bucket 406 is empty and that it has not been refilled within the current interval.

At (5), the global cache 114 dispenses tokens for Key 1 to the service host 106. Illustratively, this may be the number of tokens requested by the service host, a smaller number based on a fraction of the available tokens, etc. For example, the global cache 114 may be configured to limit the number of tokens that may be dispensed in response to a single request in order to prevent a spike in traffic from one service causing starvation of other services utilizing the same resources. The token count within global bucket 406 is then decremented to reflect the number of tokens dispensed. Service host 106 may then increment the token count of local bucket 402 to reflect the dispensed tokens.

At (6), the service host 106 sends a service response to the user device 102 via the network 104, completing the transaction. Illustratively, the service host 106 may decrement the token count for local bucket 402 before sending the response, concurrently to processing the request, or following sending of the response. The contents of the service response and the particular request processing performed by the service based on consumption of the token fall outside of this disclosure.

Figure 4:
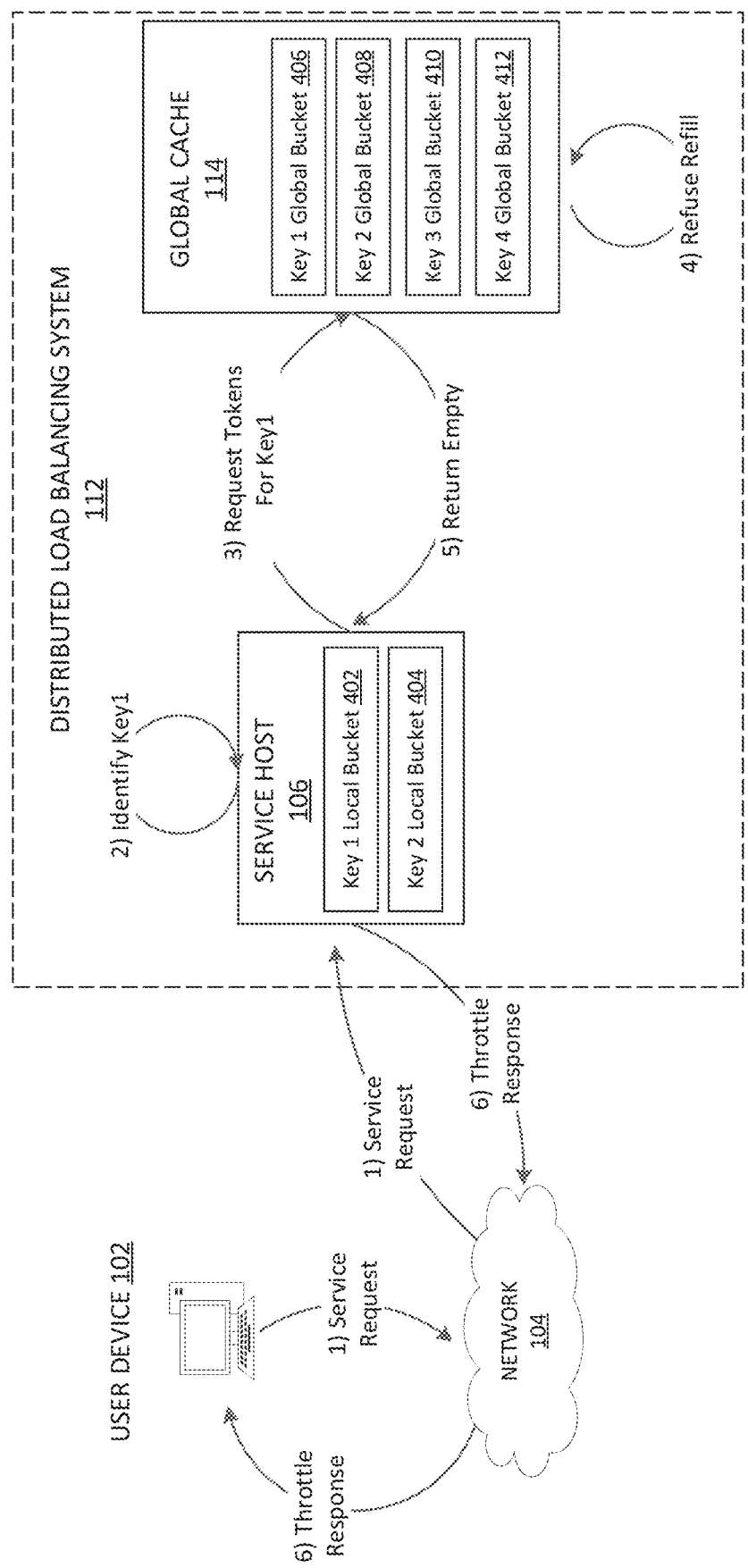
FIG. 4 depicts illustrative interactions on the distributed load-balancing system of FIG. 2 to throttle a user request for access to a shared resource.

FIG. 4 depicts illustrative interactions for handling a user request within a distributed load-balancing system to access a shared resource wherein access to the resource is denied. As in FIG. 3 above, a user device 102 sends a request for access to a shared resource to service host 106 at (1), the service host 106 identifies the key and corresponding local token bucket 402 at (2) and, finding the corresponding local token bucket empty, sends a request for more tokens to the global cache 114 at (3).

At (4), the global cache identifies empty global token bucket 406 corresponding to the token request, and determines not to refill it. Illustratively, this may be because the global cache has subtracted the refill timestamp for the global token bucket from the current time, and found that the resulting interval is less than the refill interval of the global token bucket, indicating that the global token bucket has already been refilled during the current interval and should not be refilled again to prevent overutilization of the corresponding resource.

At (5), the global cache 114 returns to service host 106 a response indicating the global token bucket for the requested key is empty. Illustratively, the service host 106 may enter a throttle state for the key as described in more detail below. For example, the service host 106 may be configured to throttle all requests for a key with a corresponding local token bucket that has no tokens and a refill timestamp within the current interval. By updating the refill timestamp for the local token bucket to the time of the request for more tokens, the service host 106 can ensure that all further requests for resources with keys corresponding to the local token bucket will be throttled until the refill interval has elapsed.

At (6), service host 106 sends a throttle response to the user device 102 via network 104. The throttle response may comprise an indication that the requested resource has exceeded its throttle limit. In these embodiments, the user device may be able to adjust its processing based on the response, such as by prompting the user to wait before making another request, or indicating to the user that they have exceeded their utilization of the requested resource. In some embodiments, the throttle response may be an error message or any other indication that the request has not been processed.

Figure 5:
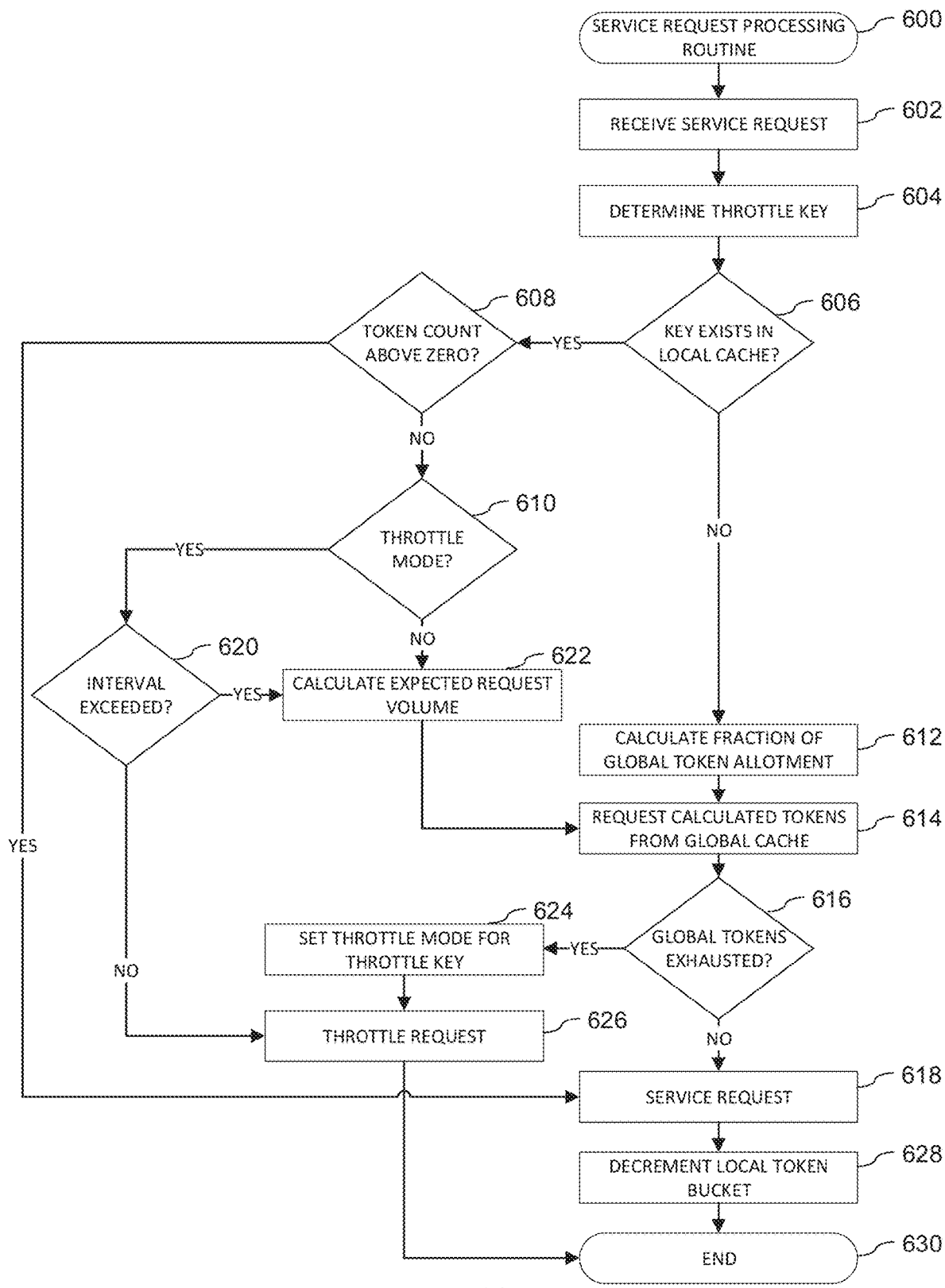
FIG. 5 depicts an illustrative routine implemented on the distributed load-balancing system of FIG. 2 to facilitate the interactions of FIG. 3 and FIG. 4.

With reference to FIG. 5, an illustrative routine 600 will be described for load balancing a service request. The routine 600 can be carried out, for example, by service host 106 of the distributed load balancing system 112.

The routine 600 begins at block 602, where the service host 106 receives a service request from a user computing device 102.

At block 604, the service host 106 determines a throttle key corresponding to the request. This throttle key may be based, for example, on parameters including the particular processing requested, the id of the shared resource requested, and/or the user account of the requesting client. For example, the throttle key may identify a user using a storage service to request access to a data object associated with a data storage unit.

At block 606, the service host 106 identifies whether the throttle key exists in the local cache. In some embodiments, this may comprise a determination that the service host 106 has previously been dispensed tokens for the identified throttle key in a recent interval. In some embodiments, the throttle key may be present in the local cache only if the service host 106 has received a request for the key in the current interval or a recent prior interval. If the throttle key is not in the local cache, the routine proceeds to block 612. If the throttle key exists in the local cache, this may correspond to a local token bucket that has used all of the local tokens for the requested key in the current interval. Additionally or alternatively, this may indicate that the key has been previously requested, but the service host has not requested more tokens for the key in the current interval. If the key exists in the local cache, the service host 106 proceeds to block 608.

At block 608, the service host 106 identifies whether the local token bucket 132 corresponding to the identified throttle key has a token count greater than 0. If the token bucket count is greater than 0, service host 106 proceeds to block 618. If the token count is 0, the service host 106 proceeds to block 610. Alternatively, the service host 106 may identify whether the local bucket 143 corresponding to the identified throttle key has a token count sufficient to service the request. For example, the service host 106 may receive a request the servicing of which would require 5 tokens. If the token count in the local token bucket corresponding to the throttle key has five or more tokens, the service host may proceed to block 618. If the token count in the local token bucket is less than five, the service host may proceed to block 610.

At block 610, the service host 106 determines whether it has entered a throttle mode for the throttle key. This may correspond to a determination that the service host 106 has requested tokens from the global cache for the throttle key and received a throttle response. If the service host 106 determines that the local token bucket has entered a throttle mode for the key, it may proceed to block 620. If the service host 106 determines that the local token bucket has not entered a throttle mode for the key, the routine proceeds to block 622.

At block 620, the service host 106 determines whether the refill interval corresponding to the throttle key has been exceeded. If the interval has been exceeded, the routine proceeds to block 622; if the interval has not been exceeded, the routine proceeds to block 626.

At block 626, the service host 106 may throttle the request. In some embodiments, the service host may return a throttle response to the client indicating that the request cannot be processed. Additionally or alternatively, the service host 106 may cache the request until the next refill interval to be processed by repeating the request processing routine 600.

Turning to block 622, the service host 106 may calculate the expected request volume for the throttle key. In some embodiments, this includes a determination of the number of allowed requests for the key in the current interval. In these embodiments, the service host 106 may calculate, based on the allowed requests in the current interval, the rate of requests for the key. In some embodiments, this may be a linear calculation. For example, the service host 106 may divide the number of requests received this interval by the fraction of the interval that has transpired. The service host 106 may then multiply the calculated request rate by the time remaining in the current interval to determine the number of tokens required to process the estimated requests that will be received in that time. Alternatively or additionally, the calculation of expected request volume may be based on the number of requests received in the previous interval or several previous intervals. In some embodiments, the calculation of expected request volume may be based on a calculation comprising a polynomial of degree greater than or equal to one. For example, the expected request volume may be calculated with the equation $((1)(tar_x)+(2)(tar_{x-1})+ \ldots +(x-1)(tar_2)+(x)(tar_1))/(1+2+ \ldots +(x-1)+x)$, where x is the number of preceding intervals of request history and $tar_x$ is the number of requests serviced by the service host during the $x^{th}$ interval. The number of tokens needed to service the estimated requests having been calculated, the routine proceeds to block 614.

At block 612, the service host 106 may calculate a fraction of the global token allotment for the key. In some embodiments, this may be a fraction of a configured throttle limit for a shared resource associated with the key. Alternatively or in addition, this fraction may be based on a configurable limit of the service host 106. Having calculated a fraction of the global token allotment, the routine proceeds to block 614.

At block 614, the service host 106 sends a request for tokens corresponding to the throttle key to the Global Cache 114. The number of tokens requested may be based on the token count calculated in one of block 614 or block 622.

At block 616, the service host 106 receives a response from the global cache 114 indicating a number of tokens dispensed from the global token bucket corresponding to the requested key. If the number of tokens dispensed is 0, the service host 106 may determine that the global token bucket has been exhausted for the key, and proceed to block 624. If the response indicates a number of tokens dispensed greater than 0, the service host 106 will increment the token count for the local token bucket, and proceed to block 618.

Turning to block 624, responsive to a determination that the global token bucket for the requested key has been exhausted, service host 106 may set the local token bucket for the requested key to a throttle mode. In some embodiments, this may cause the service host 106 to throttle all subsequent requests for the corresponding key until the refill interval has expired. Alternatively or additionally, the service host 106 may throttle a fraction of subsequent requests for the corresponding key. In some embodiments, the response from the Global Cache 114 may indicate that subsequent requests associated with the key should be throttled until a determined time and/or for a determined time period.

At block 618, service host 106 has determined that the request may be serviced. The service host 106 may then service the request. In some embodiments, this may comprise local processing of the request. Alternatively or additionally, processing the request may include sending additional requests from the service host 106 to a user device 102, and/or to auxiliary services 116 for further processing. Processing of the service request may further comprise sending a response to a user device 102 and/or an auxiliary service 116.

At block 628, service host 106 decrements the token count in the local token bucket corresponding to the throttle key associated with the service request. In some embodiments, this step may be performed on completion of servicing the request at block 618. Alternatively or additionally, service host 106 may decrement the token count for the key before the request has been serviced or concurrently to servicing the request.

Figure 6:
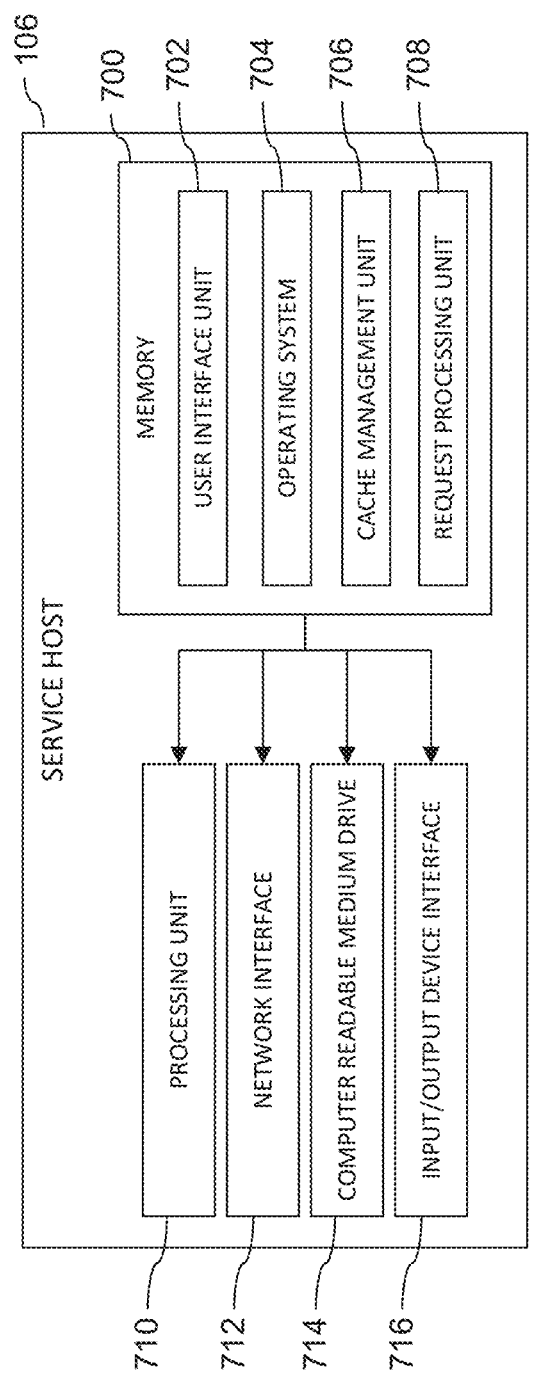
FIG. 6 depicts a general architecture of a computing device or system providing user request handling in accordance with aspects of the present disclosure.

FIG. 6 depicts a general architecture of a computing system (referenced as service host 106) that operates to facilitate load balancing of client requests in accordance with embodiments of the present disclosure. The general architecture of the service host 106 depicted in FIG. 6 includes an arrangement of computer hardware and software modules that may be used to implement aspects of the present disclosure. The hardware modules may be implemented with physical electronic devices, as discussed in greater detail below. The service host 106 may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIG. 1. As illustrated, the service host 106 includes a processing unit 710, a network interface 712, a computer readable medium drive 714, and an input/output device interface 716, all of which may communicate with one another by way of a communication bus. The network interface 712 may provide connectivity to one or more networks or computing systems. The processing unit 710 may thus receive information and instructions from other computing systems or services via the network 104. The processing unit 710 may also communicate to and from memory 700 and further provide output information for an optional display (not shown) via the input/output device interface 716. The input/output device interface 716 may also accept input from an optional input device (not shown).

The memory 700 may contain computer program instructions (grouped as modules in some embodiments) that the processing unit 710 executes in order to implement one or more aspects of the present disclosure. The memory 700 generally includes random access memory (RAM), read only memory (ROM) and/or other persistent, auxiliary or non-transitory computer readable media. The memory 700 may store an operating system 704 that provides computer program instructions for use by the processing unit 710 in the general administration and operation of the balancer 112. The memory 700 may further include computer program instructions and other information for implementing aspects of the present disclosure. For example, in one embodiment, the memory 700 includes a user interface unit 702 that generates user interfaces (and/or instructions therefor) for display upon a computing device, e.g., via a navigation and/or browsing interface such as a browser or application installed on the computing device, and an operating system 704. In addition, the memory 700 may include and/or communicate with one or more data repositories (not shown), for example, to access user program codes and/or libraries.

In addition to and/or in combination with the user interface unit 702 and operating system 704, the memory 700 may include a cache management unit 706 and request processing unit 708 that may be executed by the processing unit 710. In one embodiment, the cache management unit 706 and request processing unit 708 implement various aspects of the present disclosure. For example, the cache management unit 706 can represent code executable to manage local token buckets 132. The request processing unit 708 can represent code executable to process an individual request, such as extracting the relevant request key and processing or throttling the request according to the availability of tokens in one of the local buckets 132.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A hierarchical token bucket system for load balancing access to a network-accessible service provided by a plurality of service hosts, the system comprising:

the plurality of service hosts, each of the plurality of service hosts providing access to the network-accessible service; and a global token bucket cache comprising a plurality of global token buckets, wherein each global token bucket corresponds to a throttle key of a plurality of throttle keys and identifies a number of available tokens for the throttle key within the global token bucket, wherein the global token bucket cache is configured to:

receive, from an individual service host of the plurality of service hosts, a request for a number of tokens, the request comprising a throttle key identifying an individual global token bucket of the plurality of global token buckets;

when the number of available tokens in the individual global token bucket is greater than zero, dispense a number of tokens up to the number requested from the individual token bucket to the individual service host; and when the number of available tokens in the individual token bucket is zero, notify the individual service host that insufficient tokens exist within the individual global token bucket;

wherein the global token bucket cache is further configured to, at each interval of a set of intervals, refill each global token bucket with an additional number of tokens;

wherein each service host of the plurality of service hosts maintains a local token bucket cache comprising a plurality of local token buckets, wherein each local token bucket corresponds to a throttle key of the plurality of throttle keys and identifies a number of available tokens for the throttle key within the local token bucket, and wherein each service host is configured to:

receive an access request from a client requesting to access the network-accessible service;

determine a throttle key for the access request;

identify an individual local token bucket corresponding to the throttle key for the access request;

determine the number of available tokens in the individual local token bucket;

when the number of available tokens in the individual local token bucket is sufficient to satisfy the access request, process the access request using at least one available token in the individual local token bucket;

when the number of available tokens in the individual local token bucket is insufficient to satisfy the access request:

transmit a request to the global token bucket cache for additional tokens associated with the throttle key for the access request;

when the request to the global token bucket cache for additional tokens results in dispensing of a sufficient number of the additional tokens to satisfy the access request, store the additional tokens in the individual local token bucket and process the access request using at least one available token in the individual local token bucket; and when the request to the global token bucket cache for additional tokens results in dispensing of an insufficient number of the additional tokens to satisfy the access request, throttle the access request.

2. The hierarchical token bucket system of claim 1 wherein the service host is further configured to, when the number of available tokens in the individual local token bucket is insufficient to satisfy the access request:

query a cache to determine whether the individual local token bucket is contained in the cache;

when the individual local token bucket is contained in the cache, throttle the request;

when the individual local token bucket is not contained in the cache, add the individual local token bucket to the cache.

3. The hierarchical token bucket system of claim 1, wherein throttling a request causes the service host to throttle subsequent requests until a predetermined interval has elapsed.

4. The hierarchical token bucket system of claim 1, wherein the service host is configured to forward the access request to the network-accessible service.

5. A computer-implemented method for load balancing access to a network-accessible service provided by a plurality of service hosts, the computer-implemented method comprising:

receiving, by a service host of the plurality of service hosts, an access request from a client to access the network-accessible service;

determining a throttle key for the access request;

identifying an individual local token bucket corresponding to the throttle key for the access request;

determining a number of available tokens in the individual local token bucket;

responsive to a determination that the number of tokens in the individual local token bucket is insufficient to satisfy the access request, transmitting to a global cache a request to dispense additional tokens corresponding to the throttle key from a global token bucket for the throttle key, wherein the global cache is configured to refill the global token bucket with an additional number of tokens at each interval of a set of intervals and respond to requests to dispense additional tokens from the global token bucket by dispensing tokens to a requesting service host from the global token bucket when a number of available tokens in the global token bucket is greater than a threshold number and by notifying the requesting service host that insufficient tokens exist within the global token bucket when the number of available tokens in the global token bucket less than the threshold number;

obtaining, from the global token bucket for the throttle key maintained at the global cache, a sufficient number of additional tokens to satisfy the access request; and servicing the access request using at least the additional tokens.

6. The computer-implemented method of claim 5, further comprising, at the global cache, refilling the global token bucket associated with the throttle key responsive to the request to dispense additional tokens.

7. The computer-implemented method of claim 6, further comprising, prior to refilling the global token bucket, determining at the global cache that the number of tokens contained in the global token bucket is insufficient to dispense the additional tokens.

8. The computer-implemented method of claim 6, wherein the number of tokens added to the global token bucket when it is refilled is less than a maximum number of tokens the global token bucket can contain.

9. The computer-implemented method of claim 6, wherein a number of tokens added to the global token bucket during refilling is calculated by multiplying a refill rate of the global token bucket and an amount of time since the last refill, and wherein the number of tokens added cannot cause the number of tokens to exceed a predetermined maximum.

10. The computer-implemented of claim 5, wherein the request to dispense additional tokens requests a number of additional tokens as a proportion of a maximum number tokens that can be held in the global token bucket for the throttle key.

11. The computer-implemented method of claim 5, wherein transmitting a request to dispense additional tokens corresponding to the throttle key further comprises determining a number of tokens calculated as a weighted average of the number of requests received over a plurality of recent intervals, wherein the calculation comprises a polynomial of degree greater than or equal to one.

12. The computer-implemented method of claim 11, wherein transmitting a request to dispense additional tokens corresponding to the throttle key further comprises determining a number of tokens according to the equation: $((1)(tar_x)+(2)(tar_{x-1})+ \ldots +(x-1)(tar_2)+(x)(tar_1))/(1+2+ \ldots +(x-1)+x)$, wherein x is the number of preceding intervals and $tar_x$ is the number of requests serviced by the service host during the $x^{th}$ interval.

13. One or more non-transitory computer-readable media comprising executable instructions for load balancing access to a network-accessible service provided by a plurality of service hosts, wherein the instructions, when executed by a distributed load-balancing system, cause the distributed load-balancing system to:

receive, by a service host of the plurality of service hosts, an access request from a client to access the network-accessible service;

determine a throttle key for the access request;

identify an individual local token bucket corresponding to the throttle key for the access request;

determine a number of available tokens in the individual local token bucket;

responsive to a determination that the number of tokens in the individual local token bucket is insufficient to satisfy the access request, transmit to a global cache a request to dispense additional tokens corresponding to the throttle key from a global token bucket for the throttle key, wherein the global cache is configured to refill the global token bucket with an additional number of tokens at each interval of a set of intervals and respond to requests to dispense additional tokens from the global token bucket by dispensing tokens to a requesting service host from the global token bucket when a number of available tokens in the global token bucket is greater than a threshold number and by notifying the requesting service host that insufficient tokens exist within the global token bucket when the number of available tokens in the global token bucket less than the threshold number;

transmit the generated request to a global cache; and obtain, from the global token bucket for the throttle key maintained at the global cache, a sufficient number of additional tokens to satisfy the access request; and service the access request using at least the additional tokens.

14. The one or more non-transitory computer-readable media of claim 13, wherein the instructions cause the global cache to refill the global token bucket associated with the throttle key responsive to the request to dispense additional tokens.

15. The one or more non-transitory computer-readable media of claim 14, wherein the instructions cause the global cache to, prior to refilling the global token bucket associated with the throttle key, determine that the number of tokens in the global token bucket is insufficient to dispense the additional tokens.

16. The one or more non-transitory computer-readable media of claim 14, wherein, to refill the global token bucket associated with the throttle key, the instructions cause the global cache to add a number of tokens to the global token bucket that is less than a maximum number of tokens the global token bucket can contain.

17. The one or more non-transitory computer-readable media of claim 14, wherein the instructions cause the global cache to, prior to refilling the global token bucket associated with the throttle key, determine that the global token bucket contains no tokens.

18. The one or more non-transitory computer-readable media of claim 14, wherein, to refill the global token bucket, the instructions cause the global cache to calculate a number of tokens by multiplying a refill rate of the global token bucket with an amount of time since the last refill and add the minimum of the calculated number of tokens and an amount equal to a maximum number of tokens the global token bucket may contain minus the number of tokens the global token bucket currently contains.

19. The one or more non-transitory computer-readable media of claim 13, wherein to generate a request for additional tokens associated with the throttle key, the instructions cause the distributed load-balancing system to determine a number of tokens calculated as a weighted average of the number of requests received over a plurality of recent intervals, wherein the calculation comprises a polynomial of degree greater than or equal to one.

20. The one or more non-transitory computer-readable media of claim 19, wherein to generate a request for additional tokens associated with the throttle key, the instructions cause the distributed load-balancing system to determine a number of tokens according to the equation: $((1)(tar_x)+(2)(tar_{x-1})+ \ldots +(x-1)(tar_2)+(x)(tar_1))/(1+2+ \ldots +(x-1)+x)$, wherein x is the number of preceding intervals and $tar_x$ is the number of requests serviced by the service host during the $x^{th}$ interval.

21. The one or more non-transitory computer-readable media of claim 13, wherein the request transmitted to the global token bucket for additional tokens associated with the throttle key comprises a request for a number of tokens based on a fraction of a maximum number of tokens the global token bucket can contain.

\* \* \* \* \*